(12) United States Patent
Berthilsson et al.

(10) Patent No.: US 8,111,873 B2
(45) Date of Patent: Feb. 7, 2012

(54) METHOD FOR TRACKING OBJECTS IN A SCENE

(75) Inventors: Rikard Berthilsson, Furulund (SE); Karl Åström, Lund (SE); Håkan Ardö, Lund (SE)

(73) Assignee: Cognimatics AB, Lund (SE)

( * ) Notice: Subject to any disclaimer, the term of this patent is extended or adjusted under 35 U.S.C. 154(b) by 1149 days.

(21) Appl. No.: 11/378,265

(22) Filed: Mar. 20, 2006

(65) Prior Publication Data

US 2006/0215880 A1 Sep. 28, 2006

Related U.S. Application Data

(60) Provisional application No. 60/662,880, filed on Mar. 18, 2005.

(51) Int. Cl.
*G06K 9/00* (2006.01)
(52) U.S. Cl. ...................................................... 382/103
(58) Field of Classification Search .................... 382/103
See application file for complete search history.

(56) References Cited

U.S. PATENT DOCUMENTS

| | | | | |
|---|---|---|---|---|
| 6,982,667 | B2* | 1/2006 | Artebrant et al. | 342/95 |
| 7,343,028 | B2* | 3/2008 | Ioffe et al. | 382/118 |
| 7,379,563 | B2* | 5/2008 | Shamaie | 382/103 |
| 2003/0058340 | A1* | 3/2003 | Lin et al. | 348/159 |
| 2003/0220984 | A1* | 11/2003 | Jones et al. | 709/219 |
| 2006/0018516 | A1* | 1/2006 | Masoud et al. | 382/115 |
| 2006/0045357 | A1* | 3/2006 | Schwartz et al. | 382/232 |

OTHER PUBLICATIONS

Ardo, H., Berthilsson, R., Astrom, K., "Foreground Estimation and Hidden Markov Models for Tracking," Feb. 1, 2005. University of Edinburg, School of Informatics, [http://homepages.inf.ed.ac.uk/cgi/rbf/CVONLINE/entries.pl?TAG1437]. Accessed Apr. 19, 2009.*
Xie, X.; Evans, R.J., "Multiple target tracking using hidden Markov models," Radar Conference, 1990, Record of the IEEE 1990 International, vol., No., pp. 625-628, May 7-10, 1990.*
Blunsom, P., Hidden Markov Models, The University of Melbourne, Department of Computer Science and Software Engineering, Aug. 19, 2004.*
Roy L. Streit et al., "Probabilistic Multi-Hypothesis Tracking," Navel Undersea Warfare Center Division, Newport, RI, 1995.
Y. Bar-Shalom et al., "Joint Probabilistic Data Association for Multiple Targets in Clutter," *Proc. Conf. on Information Sciences and Systems*, pp. 404-409 (1980).

(Continued)

*Primary Examiner* — Brian Werner
*Assistant Examiner* — Nirav G Patel
(74) *Attorney, Agent, or Firm* — Harness, Dickey & Pierce, P.L.C.

(57) ABSTRACT

A method for tracking objects in a scene being viewed by a sequence of digital images comprises: separating a region of interest in the digital images into a plurality of spatially smaller, overlapping modules, and defining a hidden Markov model for each module. The method further comprises observing detections of positions of possible objects at different times, considering a set of states at a point of time ($t_1$) such that the set of states comprises a state having a global optimum probability, and backtracking through the sequence of digital images for each hidden Markov model to shrink the set of states that are possible for earlier parts of the sequence of digital images, such that a single optimal state is found for an earlier point of time ($t_2 < t_1$), whereby tracks of detected objects through the scene are determined up to the earlier point of time ($t_2$).

18 Claims, 3 Drawing Sheets

OTHER PUBLICATIONS

D. Koller et al., "Model-Based Oject Tracking in Monocular Image Sequences of Road Traffic Scenes," Intl'J. of Computer Vision 10 (1993) 257-281.

M. Isard et al., "Contour tracking by stochastic propagation of conditional density," $4^{th}$ EU Conf. Computer Vision (1996).

J. Movellan et al., "Real-Time Video Tracking Using Convolution HMMs," CVPR, (2004).

D. Reid, "An algorithm for tracking multiple targets," IEEE Trans. On Automatic Control, vol. 24(6), (1979) 943-854.

Pedro M. Jorge et al., "On-line Tracking Groups of Pedestrians with Bayesian Networks," ECCV (2004).

X. Xie et al., "Multiple Target Tracking and multiple Frequency Line Tracking Using Hidden Markov Models," Signal Processing IEEE Transactions on 39 (1991) 2659-2676.

C. Hue et al., "Tracking Multipel Objects with Particle Filtering," Aerospace & Elec. Sys, IEEE Transactions on 38 (2002) 791-812.

M. Isard et al., "BraMBLe: a Bayesian Multiple-Blob Tracker," ICCF (2001) 34-41.

S.J. Davey et al., "A Markov Model for Initiating Tracks with the Probabilistic Multi-Hypothesis Tracker," Proc. $5^{th}$ Int'l Conf on Information Fusion, (2002) 735-742 vol. I.

L. Rabiner, "A Tutorial on Hidden Markov Models and Selected Applications in Speech Recognition," Proc. IEEE 77 (1989) 257-286.

Chris Stauffer et al. "Adaptive background mixture models for real-time tracking," Proc. Conf. Computer Vision and Pattern Recognition (1999) 246-252.

Dirk Farin et al., "Robust Background Estimation for Complex Video Sequences," Int'l Conf in Image Processing (2006) pp. 145-148.

Da-shan Gao et al., "A Novel Algorithm of Adaptive Background Estimation," Int'l Conf in Image Processing (2001) 395-398.).

Ismail Haritaoglu et al., "$W^4$ S: a Real-Time System for Detecting and Tracking People in 2½D," Image & Vision Computing Jnl (1999).

Pankaj Kumar et al., "A Comparative Study of Different Color Spaces for Foreground and Shadow Detection for Traffic Monitoring System," IEEE $5^{th}$ Int'l Conf in Intelligent Transp. Sys. (2002) 100-105.

Gerard Medioni et al., "Event Detection and Analysis from Video Streams," IEEE Transactions on Pattern Anal. And Machine Intelligence (2001) 873-889.

J. Orwell et al., "Multi-camera colour tracking," $2^{nd}$ IEEE Workshop on Visual Surveillance (1999) 14-21.

Robert Pless et al., "Evaluation f fLocal Models of Dynamic Backgrounds," Conf. Computer Vision and Pattern Recognition, 73, (2003).

Andrea Prati et al., "Shadow Detection Algorithms for Traffic Flow Analysis: a Comparative Study," IEEE Int'l Transportation Systems, 340-345 (2001).

Stefan Huwer, "Adaptive Change Detection for Real-Time Surveillance Applications," $3^{rd}$ IEEE Int'l Workshop on Visual Surveillance, 37-46 (2000).

Christopher R. Wren et al., "Pfinder: Real-Time Tracking of the Human Body," IEEE Transactions on Pattern Analysis and Machine Intelligence, 78-785 1997.

\* cited by examiner

METHOD FOR TRACKING OBJECTS IN A SCENE

CROSS-REFERENCE TO RELATED APPLICATIONS

This application is a non-provisional application, which claims priority under 35U.S.C. §119 to U.S. Provisional Application No. 60/662,880 filed on Mar. 18, 2005.

TECHNICAL FIELD

The present invention relates to a method for tracking objects in a scene being viewed by a sequence of digital images.

BACKGROUND OF THE INVENTION

The problem of tracking moving objects has been studied for a long time. Typically, methods for detecting object states such as position and orientation in single frames, e.g. using edge information, templates or machine learning, are combined with dynamic models in order to gain robustness.

There are numerous techniques for object detection in individual frames. Depending on the situation different techniques can be used, such as blob detection, edge detection, dynamic shape matching, template matching or feature points. Recently methods based on machine learning have become popular.

When it comes to tracking of objects in image sequences, there are several interesting techniques that are appropriate in different settings. Examples of such techniques are Kalman filtering, as described in Koller, D., Daniilidis, K. and Nagel, H.-H., "Model-Based Object Tracking in Monocular Image Sequences of Road Traffic Scenes", *International Journal of Computer Vision*, vol. 10, pages 257-281, 1993, particle filtering, as described in Isard, M. and Blake, A., "A Visual Tracking by Stochastic Propagation of Conditional Density", *Proc. 4th European Conf. Computer Vision*, 1996, continuous state space methods, hidden Markov models (HMM) as described in Movellan, J., Hershey, J. and Susskind, J., "Real-Time Video Tracking using Convolution HMMs", *Computer Vision and Pattern Recognition*, 2004, and multi hypothesis tracking as described in Reid, D., "An Algorithm for Tracking Multiple Targets", *IEEE Transaction on Automatic Control*, vol. 24(6), pages 843-854, 1979.

When several objects are considered one model for each tracked object is often used. However, the data association problem of deciding which detections should be used to update which models has to be solved. One classical solution, joint probabilistic data association filter (JPDAF), is presented in Bar-Shalom, Y., Fortmann, T. E. and Scheffe, M., "Joint Probabilistic Data Association for Multiple Targets in Clutter", *Proc. Conf. on Information Sciences and Systems*, 1980. A different approach is to only track the objects when they are well separated and then later try to label the tracks, and give corresponding tracks the same label. A real time version of this using Bayesian networks can be found in Jorge, P. M., Abrantes, A. J. and Marques, J. S., "On-line Tracking Groups of Pedestrians with Bayesian Networks", *European Conference on Computer Vision*, 2004.

These systems can be made robust by using multi hypothesis tracking. In Streit, R. L. and Luginbuhl, T. E., "Probabilistic Multi-Hypothesis Tracking", Technical Report 10428, Naval Undersea Warfare Center, Newport, 1995, a probabilistic multi-hypothesis tracker (PMHT) is proposed where the data association problem does not have to be solved explicitly in every frame. Instead the probability of each measurement belonging to each model is estimated, but the problems of object entering and exiting the model must still be solved separately. In Davey, S. J., Gray, D. A. and Colegrove, S. B., "A Markov Model for Initiating Tracks with the Probabilistic Multi-Hypothesis Tracker", *Proc. 5th International Conference on Information Fusion*, pages 735-742, 2002, the PMHT is extended with the notion of track visibility to solve the problem of track initiation. However, their system is still based on the creation of candidate tracks that may not be promoted to real tracks but still influence other real tracks.

In Hue, C., Le Cadre, J. P. and Perez, P., "Tracking Multiple Objects with Particle Filtering", *IEEE Transactions on Aerospace and Electronic Systems*, vol. 38, pages 791-812, 2002, the state space of a particle filter is extended to handle multiple objects, but a fixed number of objects is assumed, which means that only the data association problem is handled and not the entry and exit problems. In Isard, M. and MacCormick, J., "BraMBLe: A Bayesian Multiple-Blob Tracker", *International Conference on Computer Vision*, pages 34-41, 2001, a particle filter in which the number of objects being tracked may vary during tracking is presented. The state space is parameterised using one discrete parameter, the number of visible objects, and a varying number of continuous parameters specifying the state of each object. However, the particle filtering is used, which is an approximative method.

In Xie, X. and Evans, R., "Multiple Target Tracking and Multiple Frequency Line Tracking Using Hidden Markov Models", *IEEE Transactions on Signal Processing*, vol. 39, pages 2659-2676, 1991, a method for one dimensional tracking of several received radio signals within a spectrum is presented. This means that several objects can be tracked and their entry and exit can be determined. However, when a large amount of objects and a large amount of possible positions are to be handled, the state space becomes too big to be solved by the standard Viterbi algorithm.

SUMMARY OF THE INVENTION

It is an object of the present invention to provide an improved method for tracking multiple objects in an image sequence. It is a specific object to provide a method that tracks multiple moving objects by optimising a single model describing the motions of all the objects including their entries and exits.

The objects of the invention are achieved by means of a method for tracking objects in a scene being viewed by a sequence of digital images, said method comprising: separating a region of interest in the digital images into a plurality of spatially smaller, overlapping modules; defining a hidden Markov model for each module, said hidden Markov model having a state space describing a grid of centre points of objects within the module; observing detections of positions of possible objects at different times by performing image analysis of the sequence of images; considering a set of states at a point of time ($t_1$) such that the set of states comprises a state having a global optimum probability; and backtracking through the sequence of digital images for each hidden Markov model to shrink the set of states that are possible for earlier parts of the sequence of digital images, such that a single optimal state is found for an earlier point of time ($t_2 < t_1$), whereby tracks of detected objects through the scene are determined up to the earlier point of time ($t_2$).

According to the method, the state of each object is discretized, and the entire state space parameterised as a subset of a fixed set of object centre points. In this way, the entire state space becomes discrete and the standard HMM-method with Viterbi optimisation could be applied, which guarantees a global optimum. However, with a huge state space, the model becomes too big to be solved by the standard Viterbi algorithm. Therefore, it is exploited that distant objects do not affect each other much, by breaking down the model into several spatially separated modules that are optimised independently. The global optimum may then be found for these independent modules. Because a global optimum is found, the state space can be quite sparse and still produce good results, which means that significantly fewer hypotheses needs to be tested compared to the particle filter.

Further, the inventive method only requires that the probability of an object is located at a given position. This allows detection of faint objects by multiplying these probabilities over time along the path of the object. Thus, real tracks may be created for faint objects without influencing other tracks.

According to the method it is further possible to produce results of tracking objects before the entire observation sequence has been measured. Thus, it is possible to use the method for continuous tracking of objects in real time. When results are obtained before the entire observation sequence has been measured, the global optimum for the latest observation at a point of time $t_1$ may be altered by future measurements. However, the method finds an optimum state sequence up to an earlier point of time $t_2$ such that no future observations can alter the optimum state sequence for times $t \leq t_2$.

The hidden Markov models may be defined so that adjacent models overlap by at least two states. This implies that an object moving between adjacent models may be tracked correctly. Further, as the models overlap by at least two states, every state in the image will be an internal state of some model, that is not on the border or edge of a model. The border states of a model have a higher probability of incorrectly detecting objects that are in fact outside the model. Since the overlap ensures that each state in the image is an internal state of some model, problems with objects outside a model being detected in the model can be handled by the overlapping of adjacent models.

The hidden Markov models may alternatively be defined so that adjacent models overlap by at least half a model. This implies that adjacent models will have internal states that are overlapping. Thus, adjacent models will detect same parts of a track of an object moving from one model to the neighbouring model. Further, detection in overlapping states of adjacent hidden Markov models may be used for concatenating two tracks in adjacent models into one track for one object. Thus, a single track for an object moving through the image may easily be created.

Objects detected in a border state of a model may be discarded. In this way, problems with objects outside a model being detected in a border state is easily taken care of.

The separating may create modules that cover an area being slightly larger than an object to be detected. This implies that the probability of two or more objects simultaneously being located in the same hidden Markov model is very low and, thus, the state space is reduced significantly.

According to one embodiment, only the most probable state sequences are stored and a sum of the probabilities of discarded state sequences is calculated to verify that a global optimum is determined. In this way, the state space is significantly decreased, whereby the method requires fewer calculations. Further, since the sum of the probabilities of the discarded state sequences is being calculated, the method can still ensure that there is no risk of the global optimum of the state sequences having been discarded.

The observing may comprise detecting objects by identifying foreground in the scene. The identifying of foreground may comprise: calculating a value of a feature for each point in a digital image of said sequence, said feature being independent to changes that are locally proportional so that there is some constant c such that $I_{t+1}(x+\Delta x, y+\Delta y)=cI_t(x+\Delta x, y+\Delta y)$, where $(x,y)$ is the point of interest, $I_{t+1}$ is the value of the feature at time $t+1$, $I_t$ is the value of the feature at time t, and $(\Delta x, \Delta y) \in \Omega$, where $\Omega$ is a small neighbourhood of $(0,0)$; updating a probability function describing the distribution of probabilities of the value of said feature in each point of the digital image over a sequence of digital images viewing the scene; and deciding whether the point is background or foreground in dependence of whether the value is inside or outside normal values for the point according to the probability function.

This method of identifying foreground in a scene being viewed in a digital image may be used in itself, i.e. not only for the purpose of making observations in order to detect positions of objects being tracked. Thus, the foreground may be determined in a scene e.g. for merely detecting the presence of an object in the scene.

The method is advantageous in that it provides a possibility of determining foreground objects from features that are lighting independent. Lighting changes will change the intensity uniformly over a small area in the image. Thus, the use of a locally proportional feature implies that lighting changes will not affect the value of the feature. Thereby, the method will not detect clouds suddenly occluding the sun, moving objects casting shadows or changes in indoor lighting. Further, the use of a probability function implies that slowly varying changes and periodic or semi-periodic fast changes, such as branches of a tree swaying in the wind, may also be dealt with. As the probability function is updated continuously, slow changes will update the probability function and thereby be allowed. Further, the probability function may allow a few very different values that are occurring frequently in quick changes, as these different values may all be regarded as normal values.

The calculating may comprise using two filters, wherein the filters are non-zero only on $\Omega$, and the calculating may further comprise determining the quotient of the image convolved with one filter and the image convolved with the other filter. The quotient will not be affected by a locally proportional change, since the constant c will be present both in the numerator and the denominator.

The method further comprises scanning the filters over the image in order to calculate the value of the feature for every point in the image. Since the filters are non-zero only in a small neighbourhood around the point of interest, the filters need be scanned over the image in order to obtain feature values for different points in the image.

The size of the filters may be approximately of the same size as foreground objects that are to be detected in the image. This implies that the objects to be detected will clearly affect the value of the feature and facilitate detection of the object.

The probability function may be a histogram function describing the probability that the value of the feature is within different ranges. This implies that the probability function will not make any assumptions on the feature being calculated. Thus, an object is detected merely based on a difference of the value of the feature being determined. Further, the histogram function may be easily updated.

The probability function is updated dynamically so that only recent values of the feature are used. This implies that slowly varying changes may easily be taken into account.

The speed of dynamical updating may be controlled by a learning constant. Thus, the speed may be adjusted by adjusting the learning constant.

The calculating may further comprise performing a transformation such that the value of the feature is prevented from exceeding a preset maximum value. This implies that there is no need of maintaining a histogram function having extremely large values.

The observing may comprise detecting objects in a digital image of said sequence by calculating a measurement value of a function on different patches in the digital image, said function comprising applying a Haar wavelet basis function on the patch; comparing the measurement value to threshold values, which have been determined by means of calculating values of said function for patches that comprise the object to be detected and for patches that do not comprise the object to be detected; and based on said comparing, determining whether the object is present in the image patch.

This method of detecting objects in a digital image may be used in itself, i.e. not only for the purpose of making observations in order to detect positions of objects being tracked. Thus, the detection of objects may be used for separate digital images that are not part of a sequence. The detection of objects may then be used for determining a position of a certain object in the image. This may be used e.g. for detecting eyes of faces in an image, which may be used for reducing a red eye effect of flash photography.

The method is advantageous in that it provides a possibility to detect an object within a class of objects having large variations of appearance. The function is trained in order to handle variations of the object and the threshold values are adjusted correspondingly so that a correct decision may be made whether the object is present in the image patch.

The method is further advantageous in that the measurement value may be very quickly calculated. Especially, the Haar wavelet basis functions may be computed by using a so called integral image. The values of the integral image in each pixel may be determined. Then, the Haar wavelet basis functions may be computed very quickly using four additions of the values of corner pixels of the patch to be analysed.

According to one embodiment, the detecting of objects may further comprise deciding whether a conclusion of the presence of the object in the patch may be done based on said comparing or whether a further measurement value needs be calculated for another function and the further measurement value be compared to other threshold values, wherein the steps of calculating and comparing are made in a first node of a binary decision tree so that when it is decided that a further measurement value is to be calculated, the steps of calculating and comparing are repeated for a second node in the binary decision tree, the first node pointing to the second node.

This implies that the detecting of objects may be determined in several steps. Thus, the decision is made by stepping through a binary decision tree and calculating different feature values in order to determine the presence of an object. It is desired that a decision is made as early as possible in the decision tree. However, in order to make the detecting method more reliable, several feature values should be calculated. The threshold values may then be adjusted in several steps so that the risk of making an incorrect detection or missing a detection is significantly reduced. Often a decision that no object is present may be taken at an early stage in the decision tree, whereas several features may be calculated in order to determine the presence of an object. Further, the method is computationally very effective in determining the presence of an object in an image patch, since only one or a few simple functions need to be calculated.

According to an alternative embodiment, a boosting function is applied to a sum of several functions applied to the image patch, said boosting function being used to find threshold values such that a hyperplane separating the events of an object being present or non-present in the image patch is defined.

This implies that a hyperplane is defined such that the measurement value of the sum of several functions may directly be used to decide whether the object is present in the image patch. However, the computational cost is equal whether the object is present or not, and there is no possibility to render the calculations more effective in situations where the presence or non-presence of an object in the image patch may easily be determined.

The image patches may be defined in different sizes in order to facilitate detection of objects in different scales. This implies that the different sizes of the image patch may be used such that an object will, for some size of the image patch, be of substantially the same size of the image patch, whereby detection of the object is facilitated.

BRIEF DESCRIPTION OF THE DRAWINGS

The invention will now by way of example be described in more detail with reference to the accompanying drawings.

DETAILED DESCRIPTION OF PRESENTLY PREFERRED EMBODIMENTS

In an embodiment of the invention, the problem of tracking multiple objects in image sequences is studied. The hidden Markov models, which traditionally is used to single object tracking, is extended to deal with multiple objects. Two such extensions are presented. One is based on extending the state space to that of multiple independently moving objects. The second extension uses multiple hidden Markov models. The theory has been tested on a parking lot occupancy monitoring with promising results.

Figure 1:
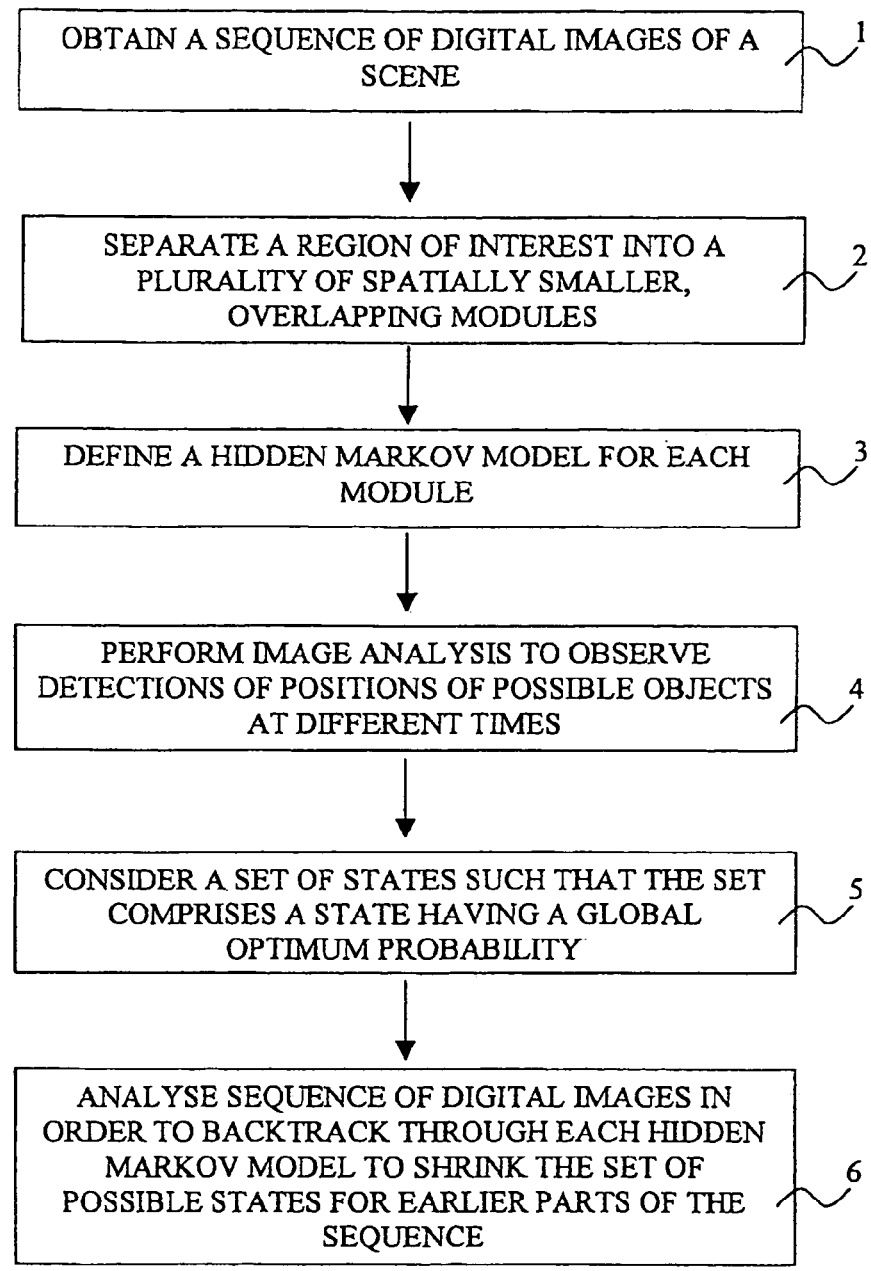
FIG. 1 is a flow chart of a method for tracking objects in a scene according to an embodiment of the invention.

Referring to FIG. 1, an overview of a method for tracking objects in a scene will be described. The scene is monitored by a digital camera for obtaining a sequence of digital images of the scene, step 1. First, a region of interest in the digital images is separated into a plurality of spatially smaller, overlapping modules, step 2. A hidden Markov model is defined for each module, step 3. The hidden Markov model has a state space describing a grid of centre points of objects within the module. Then, image analysis is performed of the sequence of images in order to observe detections of positions of possible objects at different times, step 4. A set of states at a point of time $t_1$ are considered, step 5, such that the set of states comprises a state having a global optimum probability. Thereafter, the sequence of digital images is analysed in order to backtrack through each hidden Markov model to shrink the set of states that are possible for earlier parts of the sequence of digital images, step 6. In this way, a single optimal state is found for an earlier point of time ($t_2 < t_1$), whereby tracks of detected objects through the scene are determined up to the earlier point of time ($t_2$).

In order to describe the method in further detail, hidden Markov models are first generally described and, then, the use of hidden Markov models according to an embodiment of the invention is described.

A hidden Markov model (HMM) is defined as a discrete time stochastic process with a finite number of states, $S=S_0, \ldots, S_N$ and a constant transitional probability distribution $a_{i,j}=p(q_{t+1}=S_j|q_t=S_i)$, where $Q=(q_0, \ldots, q_T)$ is a state sequence for the time $t=0, 1, \ldots, T$. The initial state distribution is denoted $\pi=(\pi_0, \ldots, \pi_N)$, where $\pi_i=p(q_0=S_i)$. The state of the process cannot be directly observed, instead some sequence of observation symbols, $O=(O_0, \ldots, O_T)$ are measured, and the observation probability distribution, $b_j(O_t)=b_{j,t}=p(O_t|q_t=S_j)$, depends on the current state. The Markov assumption gives that $$p(q_{t+1}|q_t,q_{t-1},\ldots q_0)=p(q_{t+1}|q_t),$$

$$p(O_t|q_t,q_{t-1},\ldots q_0)=p(O_t|q_t).$$

From a hidden Markov model $\lambda=(a_{i,j}, b_j, \pi)$ and an observation sequence, O, the most likely state sequence, $Q^*=\mathrm{argmax}_Q p(Q|\lambda, O)=\mathrm{argmax}_Q p(Q,O|\lambda)$, to produce O can be determined using Viterbi optimization by defining $$\delta_i(i) = \max_{q_0 \cdots q_{t-1}} p(q_0, \ldots, q_{t-1}, q_t = S_i, O_0, \ldots, O_t)$$

Note that the Markov assumption implies that $$p(q_0,\ldots,q_{t-1},q_t,O_1,\ldots,O_t)=p(O_t|q_t)p(q_t|q_{t-1})p(q_0,\ldots,q_{t-1},O_1,\ldots,O_{t-1}).$$

Thus, for $t=0$, $\delta_0(i)$ becomes $p(q_0=S_i, O_0)$, which can be calculated as $\delta_0(i)=\pi_i b_{i,0}$, and for $t>0$ it follows that $\delta_t(i)=\max_j(\delta_{t-1}(j)a_{j,i})\cdot b_{i,t}$. By also keeping track of $\Psi_t(i)=\mathrm{argmax}_j (\delta_{t-1}(j)a_{j,i})$ the optimal state sequence can be found by backtracking from $q^*_T=\mathrm{argmax}_i \delta_T(i)$, and letting $q^*_t=\Psi_{t+1}(q^*_{t+1})$.

To use HMMs for problems like tracking, where the state sequences are very long, e.g. $T\to\infty$, and results have to be produced before the entire observation sequence have been measured, some modifications to the Viterbi optimization algorithm described above are needed and have been developed according to an embodiment of the invention.

At any given time $t_1<T$, the observation symbols $O_t$ have been measured, and $\delta_t(i)$ as well as $\Psi_t(i)$ can be calculated for $0\leq t\leq t_1$. Setting $q^*_{t_1}=\mathrm{arg\,max}_i \delta_{t_1}(i)$ is no longer guaranteed to be optimal as future measurements might generate a different global optimum. So the optimal state for $t=t_1$ is unknown. Consider instead some set of states, $\theta_t$, at time t such that the global optimum $q^*_t \in \theta_t$. This is fulfilled for $\theta_{t_1}=S$. For $\theta_t$, $t<t_1$, shrinking sets of states can be found by letting $\theta_t=\Psi_{t+1}(\theta_{t+1})$.

If the dependencies of the model is sufficiently localized in time for some time $t_2<t_1$, there will be exactly one state $q^*_{t_2}\in\theta_{t_2}$, and the optimal state $q^*_t$ for $t\leq t_2$ can be obtained from backtracking from $q^*_{t_2}$. No future observations made can alter the optimum state sequence for $t\leq t_2$.

The problem with using the Viterbi optimisation for large state spaces is that $\delta_t(i)$ has to be calculated and stored for all states at each time interval regardless of how insignificantly small it might be. By instead only storing the M largest $\delta_t(i)$ at each time interval, significantly less work is needed. By also calculating an upper bound $\delta_{max}(t)$ of the $\delta_t(i)$:s not stored it is possible to know whether M were large enough for the algorithm to reach the global optimum. If not, the optimisation can be retried with a larger M.

To derive the algorithm, define $\tilde{\delta}_t(i)$ as a version of $\delta_t(i)$ ordered by decreasing value instead of state index. With the ordering function $$H_t(i)=\mathrm{arg\,max}_{\{j|H_t(k)\neq j, 0\leq k\leq i\}}\delta_t(j),$$

the definition becomes $$\tilde{\delta}_t(i)=\delta_t(H_t(i)).$$

As only the states $H_t(0 \ldots M-1)=\{S_i|i=H_t(j)$ for some j, $0\leq j\leq M-1\}$ will be stored, $\delta_{max}$ is defined as any number, preferable as low as possible, satisfying $\delta_{max}>\tilde{\delta}_t(M)$, which means that $$\delta_{max}(t)\geq \tilde{\delta}_t(k) \text{ for all } k\geq M.$$

These values have to be propagated forward in time, and according to the Viterbi algorithm $\delta_t(i)=\max_j(\tilde{\delta}_{t-1}(j)a_{j,i})\cdot b_{i,t}$. To evaluate the maximum in this formula there are two possibilities. Either the maximum is only found for some $j<M$ or it is found for some $j\geq M$. In the later case $$\max_j(\tilde{\delta}_{t-1}(j)a_{j,i}) = \max_{j\geq M}(\tilde{\delta}_{t-1}(j)a_{j,i}) \leq \max_{j\geq M}\delta_{max}(t-1)a_{max} = \delta_{max}(t-1)a_{max},$$

where $a_{max}=\max_{i,j}a_{i,j}$ is the maximum transaction probability (some constant). This means that if a maximum among the first M states larger than $\delta_{max}(t-1)a_{max}$ can be found, it has to be the global maximum. With $$P_{max}(t, i) = \max_{0\leq j\leq M}(\tilde{\delta}_{t-1}(j)a_{j,i})$$

this gives $$\max_j(\tilde{\delta}_{t-1}(j)a_{j,i}) \begin{cases} = P_{max}(t, i) & \text{if } P_{max}(t, i) > \delta_{max}(t-1)a_{max} \\ \leq \delta_{max}(t-1)a_{max} & \text{otherwise.} \end{cases}$$

It is of course possible for the maximum to be located within the first M states without $P_{max}(t,i)>\delta_{max}(t-1)a_{max}$, but there is no way of verifying that case. A refinement here would be to verify that the state $S_i$ actually is reachable from any of the states $S_j$ with $j\geq M$. The states reachable from a set of states $\hat{S}$ is the states $R(\hat{S})=\{S_i\in S|a_{j,i}>0 \text{ for some } S_j\in\hat{S}\}$.

To find the M largest values of $\delta_t(i)$, it only needs to be evaluated for the states reachable from the M stored states, that is for $i\in R(H_{t-1}(0\ldots M-1))$. All other values of i will fall into later case above where the value of $\delta_t(i)$ is unknown. This is so because if the state i is not reachable from the M first states, then $P_{max}(t,i)=0$. In this way, instead of calculating $\delta_t(i)$ for all i at each time interval, an upper bound, $\hat{\delta}_t(i)\geq\delta_t(i)$, for the states $i\in R(H_{t-1}(0\ldots M-1))$, is calculated and $\Psi_t(i)$ is extended into $\hat{\psi}_t(i)$ with a value $-1$, indicating that the exact value of $\delta_t(i)$ is unknown, by defining $$\hat{\psi}_t(i) = \begin{cases} \mathrm{argmax}_j(\delta_{t-1}(j)a_{j,i}) & \text{if } \hat{\delta}_t(i) = \delta_t(i) \\ -1 & \text{if } \hat{\delta}_t(i) > \delta_t(i). \end{cases}$$

The M largest values of $\hat{\delta}_t(i)$ and the corresponding values of $\hat{\psi}_t(i)$ are stored for use in the next time interval. When the algorithm later backtracks and $q^*_t=-1$ is found for some t then M were to small, and the optimisation can be retried for some larger M or the maximum for $0 \leq i < M-1$ can be used for an approximative solution. If an approximative solution is acceptable $\delta_{max}(t)$ does not have to be calculated at all.

To find $\delta_{max}(t)$ an upper bound for $i \notin R(H_{t-1}(0 \ldots M-1))$ is also needed. In this case $P_{max}(t,i)=0$, which means that $\max_j (\delta_{t-1}(j)a_{j,i}) \leq \delta_{max}(t-1)a_{max}$. With $b_{max}(t)=\max_i b_{i,t}$ this gives $$\delta_t(i) \leq \begin{cases} \hat{\delta}_t(i) & \text{for } i \in R(H_{t-1}(0\ldots M-1)) \\ \delta_{max}(t-1)a_{max}b_{max}(t) & \text{for } i \notin R(H_{t-1}(0\ldots M-1)), \end{cases}$$

$$\delta_{max}(t) = \max\left(\max_{i \in R(H_{t-1}(0\ldots M-1))} \hat{\delta}_t(i), \delta_{max}(t-1)a_{max}b_{max}(t)\right).$$

The problem is of course to find an upper bound $b_{max}(t)$ small enough. It is shown below how this can be done in a simple case.

In summary, the standard Viterbi algorithm is limited to only store the M largest values of $\delta_t(i)$, and the corresponding values of $\Psi_t(i)$ and $H_t(i)$. This is enough to generate approximative solutions. To verify if the solution found actually is the global optimum, an upper bound, $\delta_{max}(t)$, of the $\delta_t(i)$:s not stored is also needed. It can be calculated from an upper bound of the observation probabilities $b_{max}(t)$ given the observation symbol $O_t$.

A HMM such as described above can be used for tracking objects in a video sequence produced by a stationary camera. Initially assume that the world only contains one mobile object and that this object sometimes is visible in the video sequence and sometimes located outside the part of the world viewed by the camera. The assumption of only one object will later be removed.

The state space of the HMM is a finite set of points $S_j \in \Re^2, j=1, \ldots, N$ representing that the mass center of the object is at position $S_j$ in the camera coordinate system. The points $S_j$ are typically spread in a homogeneous grid over the image. A special state $S_0$, representing the state when the object is not visible, is also needed. The $a_{i,j}$ constants, representing probabilities of the object appearing, disappearing or moving from one position to another, can be measured from training data, or some defaults can be assumed.

The observation symbols of this model will be a binary background/foreground image, $O_t: \Re^2 \rightarrow \{0,1\}$, as produced by for example Stauffer, C. and Grimson, W., "Adaptive background mixture models for real-time tracking", *Proc. Conf. Computer Vision and Pattern Recognition*, 1999, p. 246-252. By analyzing the background/foreground segmentation algorithm, the probabilities $$p_{fg} = p(x \text{ is a foreground pixel} | O_t(x)=1),$$

and $$p_{bg} = p(x \text{ is a background pixel} | O_t(x)=0)$$

can be calculated. Typically these are well above ½. Furthermore, for the segmentation described by Stauffer et al the inequality $p_{bg} > p_{fg}$ is usually fulfilled, i.e. it is more likely for a foreground pixel to be erroneously detected as background than it is for a background pixel to be erroneously detected as foreground.

The shape of the object when located in state $S_i$, can be defined as the set of pixels, $C_{S_i}$, that the object covers when centered in at this position. To track circular objects of some radius r, let $C_{S_i} = \{x \in \Re^2; |x - X_i| < r\}$. As there is only one object in the world, when the HMM is in state $S_i$, the pixels in $C_{S_i}$ are foreground pixels and all other pixels are background pixels. The probability, $b_{i,t} = p(O_t | q_t = S_i)$, of this is $$b_{i,t} = \prod_{x \in C_{S_i}} [O_t(x)p_{fg} + (1-O_t(x))(1-p_{bg})] \cdot \prod_{x \notin C_{S_i}} [(1-O_t(x))p_{bg} + (O_t(x))(1-p_{fg})] \quad (1)$$

and thereby all parts of the HMM are defined.

To generalize the one object model in the previous section into two or several objects is straight forward. For the two object case the states becomes $S_{i,j} \in S^2 = S \times S$ and the shapes, $C_{S_{i,j}} = C_{S_i} \cup C_{S_j}$. The transitional probabilities becomes $a_{i_1 j_1 i_2 j_2} = a_{i_1 i_2} \cdot a_{j_1 j_2}$ and an additional term can be be added to the observation probability making $p(O_t | q_t = S_{i,j}) \approx 0$ if $C_{S_i} \cap C_S \cap C_{S_j} \neq \emptyset$.

There is one problem with this though. The number of states increases exponentially with the number of objects and in practice this approach is only plausible for a small number of objects within a small region of space.

To track objects travelling over some larger region, the state space becomes really huge, and it might be hard to find an upper bound $b_{max}(t)$ small enough, which means M will be large too. In this case some approximations might be necessary in order to get real time performance. The assumption that distant objects does not affect the position or movements of each other more than marginally can be exploited by using several spatially smaller modules only covering part of the region of interest. This also means that the number of objects simultaneously located within one such model would decrease, and the state space will be reduced significantly. Typically each model will be covering an area slightly larger than the objects tracked with 9×9 centre points and overlapping by at least half a model. Each of the models is optimised separately, and the results are combined as will be described below.

Figure 2:
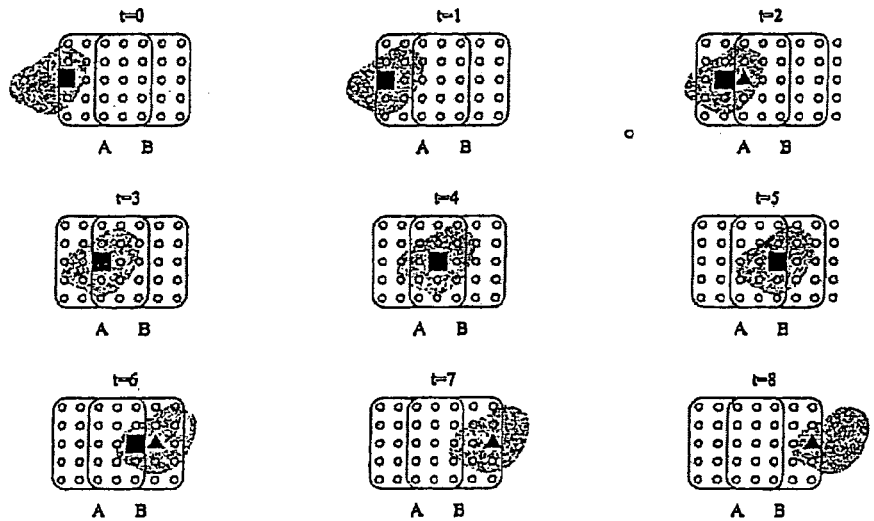
FIG. 2 is an example illustrating overlapping hidden Markov models.

In FIG. 2, there is an example of two models, A and B, showing their states as an object passes by. First, only consider the state of model A, the square. At time $t=0$, the object is still outside both the models, but model A detects it in one of its border states because that is the state of model A best explaining the situation. Then model A follows the centre of the object correctly through $t=1 \ldots 5$ and in $t=6$ the same problem as for $t=0$ arises again. The object has left model A, but is still detected in a border state.

The state of model B, the triangle, shows the same characteristics as the state of model A. The problem of objects being erroneously detected at the border states can be solved by defining the meaning of the border states to be "object located outside model" and ignore all such detections. By having 2 or more states overlap between the models all centre points are an internal state, e.g. not on the border, of some model. This means that when the two models are optimised one by one, model A will produce one track starting at $t=2$ and ending with $t=4$, while model B produces another track starting at $t=4$ and ending at $t=6$. At $t=4$ both tracks will be in the same state which is used to concatenate the two tracks into a single track. This will be possible as long as there is three or more states overlap. Typically more than three will be used in order to get a few states overlap in the resulting tracks. This is a kind of data association problem, but the overlapping states makes it trivial.

If ambiguities arise when combining tracks, this means that the models have failed, typically because they are too small or too widely separated. The models will have to be large enough to resolve any object interaction that might appear, and they will have to overlap enough to ensure that any such interaction will occur well within some model, otherwise the border effects might prevent the correct solution to be found.

In summary, instead of solving one big model covering the entire region of interest with many objects, the model is broken down into several small modules only covering a small part of the region of interest, and thus only a few objects have to be considered. Each of the small modules is optimised separately and all detections in border states ignored. The resulting overlapping, or almost overlapping, tracks are concatenated into longer tracks that might traverse the entire region of interest.

To use the method of handling large state spaces as described above, some estimate $b_{max}(t)$, as low as possible, has to be found such that $$B_{max}(t) > b_{i,t} \text{ for } i \notin R(H_{t-1}(0 \ldots M-1))$$

given the observation symbol $O_t$. For this to be simple, the state space is restricted to the states where no objects overlap. The resulting system will still be able to track objects overlapping somewhat, but the resulting tracks will be pushed apart to the closest non-overlapping state.

The estimate will be derived for any number of objects, e.g. in the state space $S^n$, where each state $S_i$ is a subset of the set of possible object centre points $X=\{X_j\}$. $S_0$ is the empty set.

To find $b_{max}(t)$ the set of centre points $S_i$ has to be found that maximises $b_{i,t}$, where $i \notin R(H_{t-1}(0 \ldots M-1))$. But not all subsets of X has to be considered. As the objects are not allowed to overlap moving from state $S_i$ to $S_j$ by adding a centre point $X_k$ will always increase or decrease the probability with the same amount, $b_X(k)$. With $C_{X_k}$ the shape of an object with centre point $X_k$, $\#C_{X_k}$ the number of foreground points in $C_{X_k}$, and $E(X_k)$ the number of foreground points in $C_{X_k} \cap O_t$ this gives $$b_{j,t} = b_{i,t} b_X(k)$$

$$b_X(k) = \prod_{x \in C_{X_k}} \left( O_t(x) \frac{p_{fg}}{1-p_{fg}} + (1-O_t(x)) \frac{1-p_{bg}}{p_{bg}} \right) = \left( \frac{p_{fg}}{1-p_{fg}} \right)^{E(X_k)} \left( \frac{1-p_{bg}}{p_{bg}} \right)^{\#C_{X_k} - E(X_k)}.$$

By here assuming that all shapes $C_{S_k}$ only differ by a translation makes it possible to calculate $E(x)$ fast using convolution.

Only the centre points with $b_X(k) > 1$ has to be considered as using any of the other will always lower the probability. All subsets of these are extracted recursively, and mapped to the states, $S_i$, they represent. If $i \notin R(H_{t-1}(0 \ldots M-1))$, the value of $b_{i,t}$ is evaluated according to equation (1). The evaluated values are compared and $b_{max}$ set to the maximum.

The tracking of objects was tested by placing one single 9×9 model at the entrance of a parking lot in order to count the entry and exit of cars, and the number of currently parked cars could be estimated.

A more elaborate solution to the problem would be to place a set of models covering the entire parking lot and detecting cars actually parking. That would make it possible to monitor any kind of parking lot and not only those with a few entrances. The models presented in this embodiment of the invention would be applicable in this case as well.

The test sequence used is 7 hour long, acquired from 16:30 in the afternoon until darkness falls. The sequence contains 17 events, both cars exiting and entering. All of them is correctly detected and one false detection is made consisting of 5 pedestrians entering the parking lot simultaneously.

Since only a small cut-out (70×80 pixels) of the image has to be processed this test executed very fast, 502 frames per second on a 2.4 GHz P4-processor including a simple background/foreground segmentation.

According to the embodiment of the invention, a multi HMM model to model several object in one single model is proposed with the advantage of solving all the problems of a multi target tracker by a Viterbi optimization. This includes the track initiating and termination as well as the model updating and data association problems. Also some approximations are suggested that allows the model to be used in real time situations such as counter of people entering or exiting an entrance of a building, parking lot monitor and car tracking in traffic surveillance videos.

The observation symbols may, as briefly described above, be detected by a method for subtracting the background in an image sequence. A specific method of subtracting the background and identifying the foreground is accomplished according to one embodiment that will be described below.

Figure 3:
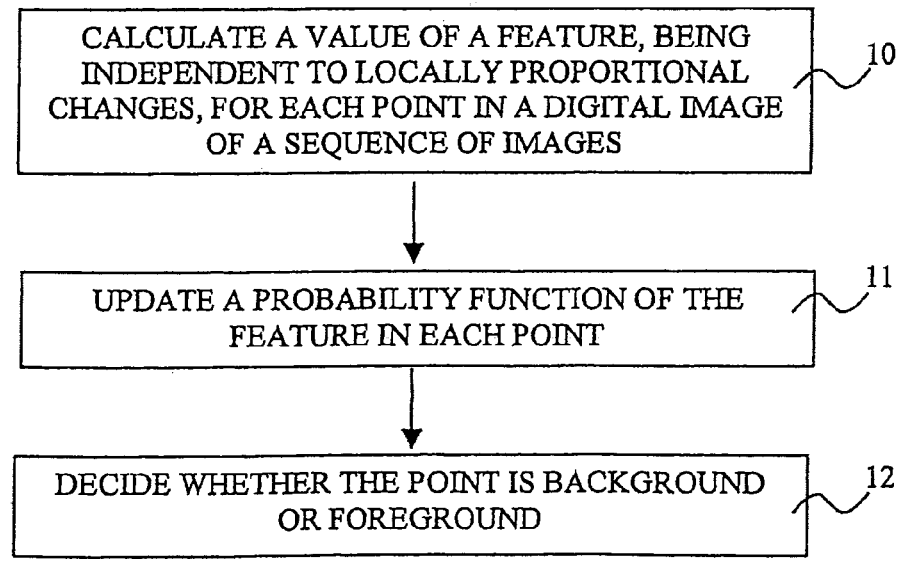
FIG. 3 is a flow chart of a method for identifying the foreground in a sequence of images according to an embodiment of the invention.

Referring to FIG. 3, an overview of a method for identifying foreground in an image sequence will be described. The method comprises calculating a value of a feature for each point in a digital image of the sequence, step 10. The feature is independent to changes that are locally proportional, whereby the feature will not be affected by lighting changes, as will be described in further detail below. Then, a probability function is updated, step 11. The probability function describes the distribution of probabilities of the value of the feature in each point of the digital image over a sequence of digital images viewing the scene. The updating implies that slowly varying changes and periodic fast changes that should belong to the background may be handled. Thereafter, a decision is made, step 12, whether the point is background or foreground in dependence of whether the value is inside or outside normal values for the point according to the probability function.

The problem of subtracting the background in an image sequence is central to computer vision. The general idea is to model the values of each pixel as a random variable. This approach has proved to be efficient when treating slowly varying changes or changes that are fairly periodic.

In this embodiment, it is proposed a novel method for background and foreground estimation that efficiently handles changes that also occur with non periodicity and arbitrarily fast. Furthermore, the method makes only very mild assumptions about the scene making it able to operate in a wide variety of conditions. This is done by introducing a novel class of invariants that are independent to the global and local intensity levels in the images. By using these features instead of the raw pixel data we automatically obtain a background estimator that is insensitive to rapid changes in lighting conditions. Furthermore, the features can be computed very efficiently using the so called integral image. The probability model is updated over time to make it able to handle new objects entering the background, and the histogram is handled directly which reduces the execution time considerably.

The objective is to extract the foreground and consequently also the background from a sequence of images. Problems being faced includes keeping execution short, slowly varying lighting conditions, rapidly varying lighting conditions, and what should be considered background.

Below integrals will be used instead of sums when summing over images. The reason for this is that it admits use of convenient notation and well known result from integration theory.

The presentation below is primarily done for sequences of gray scale images. This is mainly due to notational convenience. A short discussion is also included on how color images can be treated. Thus, let $I_t(x,y)$, where $(x,y) \in \Re^2$ and $t=0,1 \ldots$ be a sequence of gray scale images. We have extended the images to be defined on the entire real plane. This is done by setting the image intensity equal to zero outside the real image.

In order to compute a feature at each location we can use convolution $$f_t(x,y) = I * h = \int\int_{R^2} I_t(x-a, y-b)h(a,b)dadb$$

where h is a spatial filter mask. This gives a filter response at every point $(x,y) \in \Re^2$ and the statistical properties of these can be used to classify background and foreground. The well known Stauffer-Grimson estimator is obtained by letting $h=\delta_{0,0}$ be the Dirac measure at the origin in which case $I*\delta_{0,0}=I$, i.e. we base the estimator on the raw pixel data.

It is a well known problem that many background estimators are sensitive to rapid changes in lighting. Such rapid changes are often present and can occur for example when a cloud suddenly occludes the sun, when moving objects casting shadows, or for fast changes in indoor lighting.

In order to deal with this problem we would like to use features that are independent to changes that behaves at least locally in a nice manner. For this reasons we assume that there exists some constant c such that $$I_{t+1}(x+\Delta x, y+\Delta y) = cI_t(x+\Delta x, y+\Delta y), (\Delta x, \Delta y) \in \Omega \quad (2)$$

where $\Omega$ is some neighbourhood of $(0,0)$. We call the condition of equation (2) that the image sequence is locally proportional. Local proportionality is usually fulfilled, at least approximately, for most points $(x,y)$ if $\Omega$ is sufficiently small. It is however not fulfilled for example on the boundary of a moving shadow, but it is fulfilled on both sides of the boundary. To take advantage of the locally proportional assumption we introduce two filters $\phi(x,y)$ and $\Psi(x,y)$ such that $\phi$ and $\Psi$ are non-zero only on $\Omega$. Recall, for a function $f: \Re^2 \to \Re$, the notation $$\text{supp} f = \{(x,y) | f(x,y) \neq 0\}.$$

It follows that $\text{supp } \phi \subseteq \Omega$ and $\text{supp } \Psi \subseteq \Omega$.

We propose to use $$g_t(x,y) = \frac{I_t * \psi}{I_t * \varphi} \quad (3)$$

as features for each $(x,y) \in \Re^2$. Now it follows from the locally proportional assumption that $$g_{t+1}(x,y) = \frac{I_{t+1} * \psi}{I_{t+1} * \varphi} = \frac{cI_t * \psi}{cI_t * \varphi} = \frac{I_t * \psi}{I_t * \varphi} = g_t(x,y).$$

This means that for points $(x,y)$ that fulfil the local proportionality the features $g_t(x,y)$ are independent of changes lighting.

To deal with points $(x,y)$ in background that do not fulfil the locally proportional condition we follow the idea of updating probability functions. With this method it is well know that we can deal with slowly varying changes and also in some cases (semi)-periodic fast changes such as for example the branches of a tree swaying in the wind. However, instead of using a parameterized probability functions whose parameters are updated we choose to work with histograms (probability functions). Comparing with the parameterized probability functions such as multi modal Gaussian distributions the histogram makes no assumptions on the function. It is furthermore very straight forward to use being both easy to update and very fast in execution. Let $(x_k, y_k)$, $k=0, \ldots, n-1$, be a set of fixed points in the images. We would like to estimate the probability function for the values of $$g_t(x_k, y_k), k=0, \ldots, n-1,$$

and we want the probability function to be updated dynamically keeping it accurate for all times $t \geq 0$. Let $p_{k,t}$ be this probability function, which is dependent on what point $(x_k, y_k)$ we are looking at and what time t we have. There are many ways to model the unknown probability function $p_{k,t}$. One of the simplest would probably be to model it as a Gaussian probability function and then estimating the mean and variance. Another more elaborate path would be to model $p_{k,t}$ as a linear combination of Gaussian probability functions. The crucial point here is that we use a new set of features that are intensity independent and we can use any suitable model for estimating $p_{k,t}$. However, in this paper we propose to work directly with the histogram that can be obtained over time. This leads to low execution time at the cost of a moderate increase in memory requirements. Furthermore, being non-parametric, the histogram makes no assumptions about the probability function.

Assuming that the probability function $p_{k,t}$ varies slowly with t we can estimate it from the histogram $q_{t,k}$ which is obtained by computing $g_t(x_k, y_k)$ for some values of t while keeping k constant. In order to compute the histogram we first have to choose some bins $a_0, \ldots a_{n-1}$ and round off the value of $g_t(x_k, y_k)$ to the nearest bin. We denote the nearest bin to $g_t(x_k, y_k)$ by $\bar{g}_t(x_k, y_k)$. The probability function is then obtained through normalization as $$p_{t,k}(a_j) = \frac{q_{t,k}(a_j)}{\sum_j q_{t,k}(a_j)}, j = 0, \ldots, n-1$$

where $a_j$ are the bins. In order to update the probability function with a new measurement $\bar{g}_{t-1}(x_k, y_k)$ we introduce $$\gamma_{t,k}(a_j) = \begin{cases} 1, & \bar{g}_t(x_k, y_k) = a_j \\ 0, & \text{otherwise.} \end{cases}$$

We then update the probability function according to $$p_{t+1,k} = (1-\alpha)p_{t,k} + \alpha \gamma_{t+1,k}.$$

Note that $\Sigma_j p_{t,k}(a_j) = 1$ for all time t and points $(x_k, y_k)$. The constant $0 \leq \alpha \leq 1$ is referred to as the learning constant. The larger it is the faster the old probability function is forgotten. In order to make the updating faster we use the fact that $$\frac{\sum_j p_{t,k}(a_j)}{(1-\alpha)} q_{t+1,k} = q_{t,k} + \frac{\alpha \sum_j q_{t,k}(a_j)}{(1-\alpha)} \gamma_{t,k}. \quad (4)$$

The factor, $$\frac{\alpha \sum_j q_{t,k}(\alpha_j)}{(1-\alpha)},$$

becomes independent of k if α is kept constant and if the starting value is $$q_{0,k}(a_j) = \begin{cases} 1, & g_0(x_k, y_k) = a_j \\ 0, & \text{otherwise,} \end{cases}$$

for all k. We then update the histogram according to $$q_{t+1,k} := q_{t,k} + \frac{\alpha \sum_j q_{t,k}(a_j)}{(1-\alpha)} \gamma_{t,k},$$

which is obtained by replacing the left hand side of equation (4) with $q_{t+1,k}$. This gives the histogram up to scale. However, the scale is not important here. It follows that the update is done very fast, requiring only one addition per histogram. Note also that $\Sigma_j q_{t,k}(a_j)$ only depends on t and not k. Thus, computing the probability $p_{t,k}(a_j)$ requires only division by a number that is the same for all positions $(x_k, y_k)$.

There is a great degree of freedom in choosing the filters Ψ and φ which can be exploited to optimize the accuracy. A natural choice is to choose Ψ such that supp Ψ is approximately of the same size as the objects (foreground) we would like to be able to detect. The filter φ can then be chosen such that supp φ is large enough to contain a significant portion that is not covered by an object of interest. A more elaborate way would be to find Ψ and φ such that the feature $g_t(x_k, y_k)$ has significantly different values when $(x_k, y_k)$ is a foreground pixel compared to when it belongs to the background. This will however require that we annotate the image sequence with what regions are foreground and background by hand before training. However, it is worth noting that foreground objects will eventually become background if they stop moving in the scene regardless of what features we choose. This is due to the dynamic updating of the histograms. The optimization of filters should be thought of as optimization on average between specific moving objects and general background.

A problem is that the features $g_t(x_k, y_k)$ may take arbitrarily large values in a worst case scenario and this will cause problem when estimating a histogram. Assume that we require our feature values to be integers in the interval [0, n−1]. As a first step we would then like to find an affine transformation h: $\Re \to \Re$ such that $h(g_t(x_k, y_k)) \in [0, n-1]$ as often as possible. Let $m_{t,k}$ and $\sigma_{t,k}$ be the mean and standard deviation of the values of $g_t(x_k, y_k)$, respectively. we update these values according to $$m_{t+1,k} = (1-\alpha)m_{t,k} + \alpha g_t(x_k, y_k)$$

and $$\sigma_{t+1} = (1-\alpha)\sigma_{t,k} + (1-\alpha)|g_t(x_k, y_k) - m_{t,k}|,$$

where α is the learning constant as described above. We now transform the feature $g_t(x_k, y_k)$ by the affine transformation $$\frac{g_t(x_k, y_k) - m_{t,k}}{\sigma_{t,k}} \frac{n}{4} + \frac{n}{2}$$

which has mean equals to n/2 and standard deviation n/4. To be sure that we never get values out side the interval [0, n−1], we introduce the transformed features $$h_t(x_k, y_k) = \left[\min\left(\max\left(\frac{g_t(x_k, y_k) - m_{t,k}}{\sigma_{t,k}} \frac{n}{4} + \frac{n}{2}, 0\right), n-1\right)\right],$$

where [x] denotes rounding to nearest integer ≦x.

In this section we show a general result for intensity independent features. Let $\Re_+$ be the set of positive real numbers. Then an intensity independent feature f: $\Re_+^n \to \Re^m$ is characterized by the property f(x)=f(cx) for any real c>0 and $x \in \Re_+^n$. It is easily seen that $$f(x) = \sum_{j=1}^n m_j \log(x_j) \tag{5}$$

is intensity independent if $$\sum_{j=1}^n m_j = 0.$$

The following theorem shows that the reverse is also true, such that all intensity independent features can be written as functions of sums of the form of equation (5). For convenience we introduce the notation log(x) to denote the vector $(\log(x_1), \ldots, \log(x_n))^T$ and similarly for exp(x).

Theorem 1. A feature f: $\Re_+^n \to \Re^m$, where n>1, is intensity independent if and only if it can be written as $$f(x) = g(M \log(x)), x \in \Re_+^n,$$

for some g: $\Re^{n-1} \to \Re^m$ and M is an (n−1)×n matrix with row sums equal to 0.

Proof. Let $x \in \Re_+^n$. Then, f(x)=f∘exp∘log(x), where ∘ denotes composition of function such that $$f(g(x)) = f \cdot g(x).$$

Let $P = \begin{pmatrix} N \\ M \end{pmatrix}$ where N is a 1×n matrix with only ones and M is an (n−1)×n matrix with rows that are orthogonal to each other and to the row of N. It follows that all the row sums of P are equal to zero except for the first. Furthermore, P is non-singular and $$f(x) = f(\exp(P^{-1} P \log(x))).$$

Set h(y)=f(exp($P^{-1}$y)). It then follows that N log(cx)=n log (c)N log(x) and M log(cx)=M log(x). The intensity independence gives that h(P log(cx))=h(P log(x)) for all $x \in \Re_+^n$ and c>0, implying that h($a_0$,b)=h(a,b), for all $a_0$, $a \in \Re$ and b=M log(x)$\in \Re^{n-1}$. The theorem follows by setting g(b)=h($a_0$,b).

It is easily seen that the proposed features of equation (3) falls neatly into this category of features. The particular choice of features in this paper is due to that these are particularly computationally inexpensive to use.

The convolution for computing equation (3) can of course be done using FFT with a computational cost of O(MN log (MN)) for M×N images. However, if we let the filters φ and Ψ, be simple functions like for example Haar wavelets then we can use the well known integral image to speed up the computation. Let $$J(x, y) = \int_{-\infty}^{x} \int_{-\infty}^{y} I(a, b) \, da \, db$$

be the integral image of a gray scale image I. Then J can be computed with a computational cost of about 4 MN additions for an M×N image I. For notational convenience we just treat the filter φ below and furthermore we assume that $$\varphi(x, y) = \begin{cases} 1, & |x| \le c, |y| \le c \\ 0, & \text{otherwise.} \end{cases} \quad (6)$$

In order to fulfil supp φ ⊂ Ω we should choose 0<c sufficiently small. It follows that $\overline{I*\phi}(x,y)=J(x-c,y-c)+J(x+c,y+c)-J(x-c,y+c)-J(x+c,y-c)$ requiring only four additions for each (x,y). A general Haar wavelet is a linear combination of functions like equation (6) resulting in maximum of 16 additions for each (x,y). A system was implemented in C running on image sequences having 352×288 in resolution. For each pixel $(x_k, y_k)$ we compute features $g_t(x_k, y_k)$; update $m_{t,k}$ and $\sigma_{t,k}$; compute the affinely transformed features $h_t(x_k, y_k)$; and update the corresponding histograms. This runs at about 20 frames per second on a 2.4 GHz P4 processor. A binary image, estimating the foreground, was obtained by setting a threshold for the probabilities. This threshold was the same for each pixel $(x_k, y_k)$.

For color images we can apply the same machinery as above by for example treating each color channel separately. This requires that the color channels are independent which is normally not the case for RGB. However, it does hold approximately for other types of color codings. We can also use several filters $\phi_j$ and $\Psi_j$, j=0, 1, . . . . This improves the accuracy at the cost of more memory requirements and computational load. Here again we have to assume independence if the model should be manageable.

This embodiment of the invention introduces a novel method for estimating the foreground and background in image sequences which could either gray scale or color. This is done by introducing a class of features that are independent of changes in lighting under mild assumptions. The probability functions for the values of the features are approximated by the sampled histogram which are dynamically updated at each frame. This results in an algorithm with low computational cost and consequently high execution speed. It has been found that the proposed method can estimate the foreground reliable in situations where traditional methods fail. Experiment have been conducted with a system for detecting when cars are parking on a parking lot. The experiment was done on a image sequence that contained a lot of moving clouds casting shadows in the scene. Only four cars were detected, which was correct according to manual inspection.

The observation symbols may, alternatively, be detected by detecting specific objects in a digital image. A specific method of detecting objects will be described below.

Figure 4:
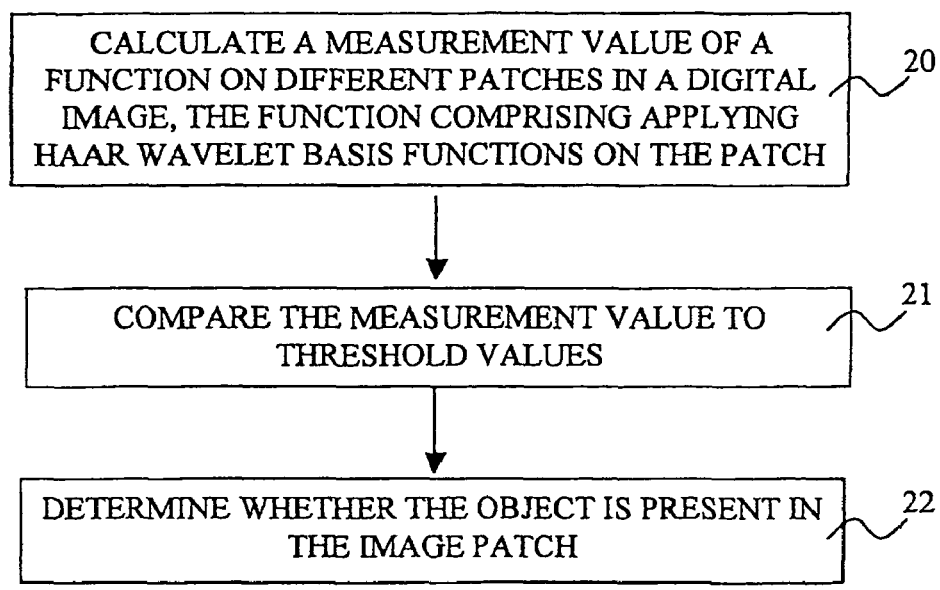
FIG. 4 is a flow chart of a method for detecting objects in a digital image according to an embodiment of the invention.

Referring to FIG. 4, an overview of the method for detecting objects in a digital image will be described. The method comprises calculating a measurement value of a function on different patches in the digital image, step 20. The function comprises applying a Haar wavelet basis function on the patch. The method further comprises comparing the measurement value to threshold values, step 21. The threshold values may have been determined by means of calculating values of the function for patches that comprise the object to be detected and for patches that do not comprise the object to be detected. The method finally comprises determining whether the object is present in the image patch, step 22. The determination is based on the comparing of the measurement value to threshold values.

This method may be generally used for detecting objects in an image and need not necessarily be connected to detecting objects in a sequence of images in order to track the objects. Therefore, the method is described below specifically with a reference to detecting eyes, nose and mouth in separate digital images. However, the method may naturally be adapted for detecting objects that are to be tracked in a sequence of digital images.

In this embodiment, we introduce a novel method for finding objects in images. The method is based on selecting good features from the wavelet transformation of the image using the Haar basis. The features can be computed fast by using the so called integral image. Furthermore the features are arranged in cascaded binary decision trees. The method has successfully been applied to detecting eyes, nose and mouth of faces. Furthermore, the result can be used for reducing the red eye effect that occurs when taking flash photos.

A central problem in cognitive vision is to detect objects of interest in images. The problem has been studied extensively. The major difficulties lie in the fact that large variations of appearance may be present within a single class of objects. This is for example the case with faces that may appear very differently due to skin color, hair style, beard, glasses etc. The camera position relative to the object also greatly influence the shape of the object in the image plane. Thus in order to construct a method that can detect objects reliable it has to be insensitive to change of lighting, change of view point, image resolution, occlusions, change of color, and change of shape, etc to a certain degree.

In this embodiment, we present a method that is able to detect objects in a reliable way. Furthermore, the method is computationally very effective.

The objective is to design a method for detection of objects that is both general, accurate and has a low computational cost. To start with let $$\phi=(\phi_1,\phi_2,\phi_3): \Re^2 \to \Re^3,$$

be a color image defined on the entire real plane. This done by setting the image intensity equal to zero outside the real image. Let $\Omega \in \Re^2$ be the set where the real image is defined. Thus, $\phi \equiv (0,0,0)$ outside Ω. In relation to this we will also use the notation $$\text{supp } \phi = \{(x,y)|f(x,y) \ne 0\}$$

to denote the set where a function is nonzero.

In the experiments below we have used color images with RGB coding. However, any color coding could be used. Note that we use a continuous image model instead of a discrete model. Thus, we use integrals instead of sums when summing over images.

We are going to search for objects at different scale and position. In that sense the detection method will be independent of scale and position but it will in general not be independent to other transformations like rotation and more generally projective transformations. It is of course possible to search different angles of rotation also but that will be at the cost of higher computational load.

From the original image $\phi$ we crop out image patches by introducing the images $$\phi_{j,k}(x,y) = \phi(\sigma_j(x-a_k), \sigma_j(y-b_k)),$$

for some scales $\sigma_j > 0$, $j=0, \ldots, n_j-1$ and translations $(a_k, b_k) \in \Re^2$, $k=0, \ldots n_j-1$\$. It follows that images $\phi_{j,k}(x,y)$ when restricting the variables (x,y) to the set $\Omega$ corresponds to different image patches of the original image $\phi$ that has been translated and scaled. The scale $\sigma_j$ gives the size of an image patch and the translation $(a_k, b_k)$ the position.

Let $\phi_j : \Omega \to \Re$, $j=0, \ldots n-1$ be a finite set of the Haar orthonormal wavelet basis functions on $\Omega$, i.e.

$$\int\int_\Omega \psi_j \psi_k \, dx = \begin{cases} 1, & j=k \\ 0, & j \neq k. \end{cases}$$

Thus, for any image $\phi : \Omega \to \Re$ it follows that $$\varphi \approx \sum_{j=0}^{n-1} \left\{ \int\int_\Omega \psi_j \varphi \, dx \right\} \psi_j,$$

where the approximation gets better with increasing n.

We propose to use $$f_j = \frac{\int\int_\Omega \varphi(x,y) \psi_j(x,y) \, dx \, dy}{\int\int_\Omega \varphi_r(x,y) + \varphi_g(x,y) + \varphi_b(x,y) \, dx \, dy} \in R^3$$

as candidates for good features. A subset of these are chosen and their values will be the basis for determining whether or not an image patch $\phi_{j,k}$ contains an object of the class we are looking for or not.

We have studied two scenario's for using the features $f_j$. The first is based on finding a set of separating hyperplanes in a similar fashion as what is done in ADA Boost. Here we optimize the function $$\sum_{j=0}^{n-1} c_j \, \text{sign}(f_j \cdot v_j - \sigma_j),$$

over the variables $v_j \in \Re^3$, $\sigma_j \in \Re$, $c_j$ and n, such that image patches containing an object from the object class get positive values and negative otherwise. This approach have problems with object classes that contain large variation and/or object classes that do not contain much visual information at all, such as for example eyes in low resolution. For these cases there do not seem to be separating hyperplanes defined by $(c_0, \ldots c_{n-1})$. Furthermore, the optimization is fairly complicated being highly non linear and not even continuous.

More promising results have been obtained from using CART which is a class of binary decision trees. In this case we need only find affine hyperplanes $$f_j \mapsto (f_j \cdot v_j - \sigma_j)$$

that separates the data as good as possible. In order to do this let $$\{f_j\}_0^{n_f-1} = \{a_j\}_0^{n_a-1} \cup \{b_j\}_0^{n_b-1},$$

where the union is disjoint and $n_a + n_b = n_f$. The set of feature values $\{a_j\}_0^{n_a-1}$ comes from the image patches containing objects from the chosen object class and the set $\{b_j\}_0^{n_b-1}$ from patches that do not. Write $\tilde{a}_j = (a_j, 1)$ and $\tilde{b}_j = b_j$ in extended coordinates, i.e. we add an extra last coordinate having value 1. Then the problem is to find $w = (w_1, w_2, w_3, w_4)$ such that $$\begin{cases} w \cdot a_j > \delta \\ w \cdot b_j < -\delta' \end{cases}$$

where $\delta > 0$. By setting $\tilde{f}_j = \tilde{a}_j$, $j=0, \ldots, n_a-1$ and $\tilde{f}_{j+n_a} = -\tilde{b}_j$, $j=0, \ldots, n_b-1$, we should solve $$w \cdot \tilde{f}_j > \delta.$$

We solve this by using gradient methods on $$Q(w) = \sum_0^{n_f-1} F(\delta - w \cdot \tilde{f}_j)$$

where $$F(x) = \begin{cases} x^2, & x > 0 \\ 0, & x \leq 0 \end{cases} \in C^1.$$

An implementation has been done in C. It is based on using the so called integral image. Functions like $f_j$ can be computed efficiently for Haar wavelets or scale functions. Let $$\Phi_{j,k}(x,y) = \int_{-\infty}^x \int_{-\infty}^y \varphi_{j,k}(a,b) \, da \, db,$$

be the integral image with a computational cost of about 4 MN additions for M×N images. It follows that $$\int_a^b \int_c^d \varphi_{j,k}(x,y) \, dx \, dy = \Phi_{j,k}(a,c) + \Phi_{j,k}(b,d) - \Phi_{j,k}(a,d) - \Phi_{j,k}(b,c)$$

requiring only four additions. In reality we will of course compute the integral image of the original image $\phi$ so that we do not have to compute it for every image patch $\phi_{j,k}$.

The algorithm has been tested and trained on color JPEG images ranging in resolution from 160×120 pixels to 1600×1200. We used 813 images for the training. The eye detection algorithm first searched for faces and then restricted the search to the faces for finding eyes. If no face was found the entire image was scanned. For nose and mouth detection only faces were searched and never the entire image. The result is presented in table below.

|  | Eye | nose | mouth |
| --- | --- | --- | --- |
| tested images | 355 | 349 | 349 |
| hit rate(%) | 92% | 96% | 94% |

The red eye effect that can be seen on flash photo comes from fact that flash light enters the iris and then reflects out again. Due to the red color of the blood vessels at the retina, only red color is reflected. The pre-flash functionality that many cameras have, force the iris to contract before the actual flash photo is taken and thereby reducing the amount of light entering and reflecting from the interior of eye. However, the effect never disappears totally. The eye detector may be used in order to wash off the red color of eyes in images.

The foregoing has been a description of certain preferred embodiments of the present invention, but it is not intended to limit the invention in any way. Rather, many modifications, variations, and changes in details may be made within the scope of the present invention.

The invention claimed is:

1. A method for tracking objects in a scene being viewed by a sequence of digital images, said method comprising:
   separating, by a processor, a region of interest in the digital images into a plurality of spatially smaller, overlapping modules,
   defining, by a processor, a hidden Markov model for each module, said hidden Markov model having a state space describing a grid of center points of objects within the module,
   observing, by a processor, detections of positions of possible objects at different times by performing image analysis of the sequence of images,
   considering, by a processor, a set of states at a point of time ($t_1$) such that the set of states includes a state having a global optimum probability, wherein said point of time ($t_1$) occurs before the entire sequence of digital images has been measured ($t_1 < T$), and
   backtracking, by the processor, through the sequence of digital images for each hidden Markov model to shrink the set of states that are possible for earlier parts of the sequence of digital images, wherein said backtracking includes starting backtracking from each state in said set of states at a point of time ($t_1$) until a single optimal state is found for an earlier point of time ($t_2 < t_1$), whereby tracks of detected objects through the scene are determined up to the earlier point of time ($t_2$),
   wherein only the most probable state sequences are stored and wherein a sum of probabilities of discarded state sequences is calculated to verify that a global optimum is determined.

2. The method according to claim 1, wherein the hidden Markov models are defined so that adjacent models overlap by at least two states.

3. The method according to claim 1, wherein the hidden Markov models are defined so that adjacent models overlap by at least half a model.

4. The method according to claim 3, wherein objects detected in a border state of a model are discarded.

5. The method according to claim 3, wherein detection in overlapping states of adjacent hidden Markov models are used for concatenating two tracks in adjacent models into one track for one object.

6. The method according to claim 1, wherein said separating creates modules that cover an area being slightly larger than an object to be detected.

7. The method according to claim 1, further comprising calculating an upper bound for the probabilities of discarded state sequences to verify that a global optimum is determined.

8. A method for tracking objects in a scene being viewed by a sequence of digital images, said method comprising:
   separating, by a processor, a region of interest in the digital images into a plurality of spatially smaller, overlapping modules,
   defining, by a processor, a hidden Markov model for each module, said hidden Markov model having a state space describing a grid of center points of objects within the module,
   observing, by a processor, detections of positions of possible objects at different times by performing image analysis of the sequence of images,
   considering, by a processor, a set of states at a point of time ($t_1$) such that the set of states includes a state having a global optimum probability, wherein said point of time ($t_1$) occurs before the entire sequence of digital images has been measured ($t_1 < T$), and
   backtracking, by the processor, through the sequence of digital images for each hidden Markov model to shrink the set of states that are possible for earlier parts of the sequence of digital images, wherein said backtracking includes starting backtracking from each state in said set of states at a point of time ($t_1$) until a single optimal state is found for an earlier point of time ($t_2 < t_1$), whereby tracks of detected objects through the scene are determined up to the earlier point of time ($t_2$),
   wherein said observing includes detecting objects by identifying foreground in the scene, and
   wherein said identifying of foreground includes:
   calculating a value of a feature for each point in a digital image of said sequence, said feature being independent to changes that are locally proportional so that there is some constant c such that $I_{t+1}(x+\Delta x, y+\Delta y) = cI_t(x+\Delta x, y+\Delta y)$, where (x,y) is the point of interest, $I_{t+1}$ is the value of the feature at time t+1, $I_t$ is the value of the feature at time t, and $(\Delta x, \Delta y) \in \Omega$, where $\Omega$ is a small neighbourhood of (0,0),
   updating a probability function describing the distribution of probabilities of the value of said feature in each point of the digital image over a sequence of digital images viewing the scene, and
   deciding whether the point is background or foreground in dependence of whether the value is inside or outside normal values for the point according to the probability function.

9. The method according to claim 8, wherein said calculating comprises using two filters, said filters being non-zero only on $\Omega$, and said calculating further comprises determining the quotient of the image convolved with one filter and the image convolved with the other filter.

10. The method according to claim 9, further comprising scanning said filters over the image in order to calculate the value of the feature for every point in the image.

11. The method according to claim 9, wherein the size of the filters is approximately of the same size as foreground objects that are to be detected in the image.

12. The method according to claim 8, wherein the probability function is a histogram function describing the probability that the value of the feature is within different ranges.

13. The method according to claim 12, wherein the probability function is updated dynamically so that only recent values of the feature are used.

14. The method according to claim 13, wherein the speed of dynamical updating is controlled by a learning constant.

15. The method according to claim 8, wherein said calculating comprises performing a transformation such that the value of the feature is prevented from exceeding a preset maximum value.

16. A method for tracking objects in a scene being viewed by a sequence of digital images, said method comprising:

separating, by a processor, a region of interest in the digital images into a plurality of spatially smaller, overlapping modules, defining, by a processor, a hidden Markov model for each module, said hidden Markov model having a state space describing a grid of center points of objects within the module, observing, by a processor, detections of positions of possible objects at different times by performing image analysis of the sequence of images, considering, by a processor, a set of states at a point of time $(t_1)$ such that the set of states includes a state having a global optimum probability, wherein said point of time $(t_1)$ occurs before the entire sequence of digital images has been measured $(t_1<T)$, backtracking, by the processor, through the sequence of digital images for each hidden Markov model to shrink the set of states that are possible for earlier parts of the sequence of digital images, wherein said backtracking includes starting backtracking from each state in said set of states at a point of time $(t_1)$ until a single optimal state is found for an earlier point of time $(t_2<t_1)$, whereby tracks of detected objects through the scene are determined up to the earlier point of time $(t_2)$, wherein said observing includes detecting objects in a digital image of said sequence by:

calculating a measurement value of a function on different patches in the digital image, said function including applying a Haar wavelet basis function on the patch, comparing the measurement value to threshold values, which have been determined by means of calculating values of said function for patches that include the object to be detected and for patches that do not include the object to be detected, and based on said comparing, determining whether the object is present in the image patch, and deciding whether a conclusion of the presence of the object in the patch may be done based on said comparing or whether a further measurement value needs be calculated for another function and the further measurement value be compared to other threshold values, wherein the steps of calculating and comparing are made in a first node of a binary decision tree so that when it is decided that a further measurement value is to be calculated, the steps of calculating and comparing are repeated for a second node in the binary decision tree, the first node pointing to the second node.

17. The method according to claim 16, wherein a boosting function is applied to a sum of several functions applied to the image patch, said boosting function being used to find threshold values such that a hyper-plane separating the events of an object being present or non-present in the image patch is defined.

18. The method according to claim 16, wherein the image patches are defined in different sizes in order to facilitate detection of objects in different scales.

* * * * *